United States Patent
Pandey

(10) Patent No.: US 9,680,664 B2
(45) Date of Patent: Jun. 13, 2017

(54) USING A MULTICAST ADDRESS AS A TUNNEL REMOTE GATEWAY ADDRESS IN A LAYER 2 TUNNELING PROTOCOL ACCESS CONCENTRATOR

(71) Applicant: Juniper Networks, Inc., Sunnyvale, CA (US)

(72) Inventor: Gourav Pandey, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 70 days.

(21) Appl. No.: 14/867,775

(22) Filed: Sep. 28, 2015

(65) Prior Publication Data

US 2017/0093598 A1    Mar. 30, 2017

(51) Int. Cl.
*H04L 12/28* (2006.01)
*H04L 12/46* (2006.01)
*H04L 29/06* (2006.01)

(52) U.S. Cl.
CPC .......... *H04L 12/4633* (2013.01); *H04L 69/14* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,917,592 B1 * | 7/2005 | Ramankutty | H04L 12/2856 370/237 |
| 7,225,236 B1 | 5/2007 | Puthiyandyil et al. | |
| 7,487,243 B1 | 2/2009 | Zielinski et al. | |
| 2005/0163146 A1 * | 7/2005 | Ota | H04L 12/4633 370/432 |

FOREIGN PATENT DOCUMENTS

JP    2008/271138    11/2008

OTHER PUBLICATIONS

Bourdon, Extensions to Support Efficient Carrying of Multicast Traffic in Layer-2 Tunneling Protocol (L2TP), RFC 4045, 28 pages, Apr. 2005.*
H3C, "06-VPN Volume", http://www.h3c.com/portal/Technical_Support_Documents/Technical_Documents/Security_Products/H3C_SecPath_F1000-E/Configuration/Operation_Manual/H3C_SecPath_High-End_OM(F3169_F3207)-5PW106/06/201109/725906_1285_0.htm, Mar. 8, 2011, 34 pages.

(Continued)

*Primary Examiner* — Frank Duong
(74) *Attorney, Agent, or Firm* — Harrity & Harrity, LLP

(57) ABSTRACT

A layer 2 tunneling protocol access concentrator (LAC) may receive an indication to set up a layer 2 tunneling protocol (L2TP) tunnel. The LAC may determine, based on the indication, a multicast address associated with initiating setup of the L2TP tunnel. The LAC may provide, to the multicast address, a request associated with initiating the L2TP tunnel. The request may be provided such that a plurality of L2TP network servers (LNSs) receives the request. The LAC may receive a set of responses to the request. The set of responses may be provided by a respective set of LNSs. The plurality of LNSs may include the respective set of LNSs. The LAC may select, based on the set of responses, a particular LNS, of the respective set of LNSs, with which to set up the L2TP tunnel.

20 Claims, 7 Drawing Sheets

(56) References Cited

OTHER PUBLICATIONS

Juniper Networks, Inc., "L2TP for Subscriber Access Overview", http://www.juniper.net/documentation/en_US/junos12.3/topics/concept/subscribermanagementl2tpoverview.html, Nov. 29, 2012, 2 pages.
Wikipedia, "Layer 2 Tunneling Protocol", https://en.wikipedia.org/wiki/Layer_2_Tunneling_Protocol, Aug. 14, 2015, 7 pages.
Townsley et al., "Layer Two Tunneling Protocol 'L2TP'", Network Working Group, https://tools.ietf.org/html/rfc2661, Aug. 1999, 160 pages.
European Search Report for European Application No. 16155406.8; issued Feb. 15, 2017, 11 pages.
Townsley et al., "Layer 2 Tunneling Protocol (L2TP) Active Discovery Relay for PPP over Ethernet (PPPoE)", Internet Engineering Task Force, IETF; STANDARDWORKINGDRAFT Internet Society (ISOC) 4, Rue des Falaises CH—1205 Geneva, Switzerland, Jul. 1, 2001, 7 pages.
Townsley et al., "Layer Two Tunneling Protocol"L2TP, Network Working Group RFC 1717, Internet Society (ISOC) 4, Rue des Falaises CH—1205 Geneva, Switzerland, CH, Aug. 1, 1999, 81 pages.

\* cited by examiner

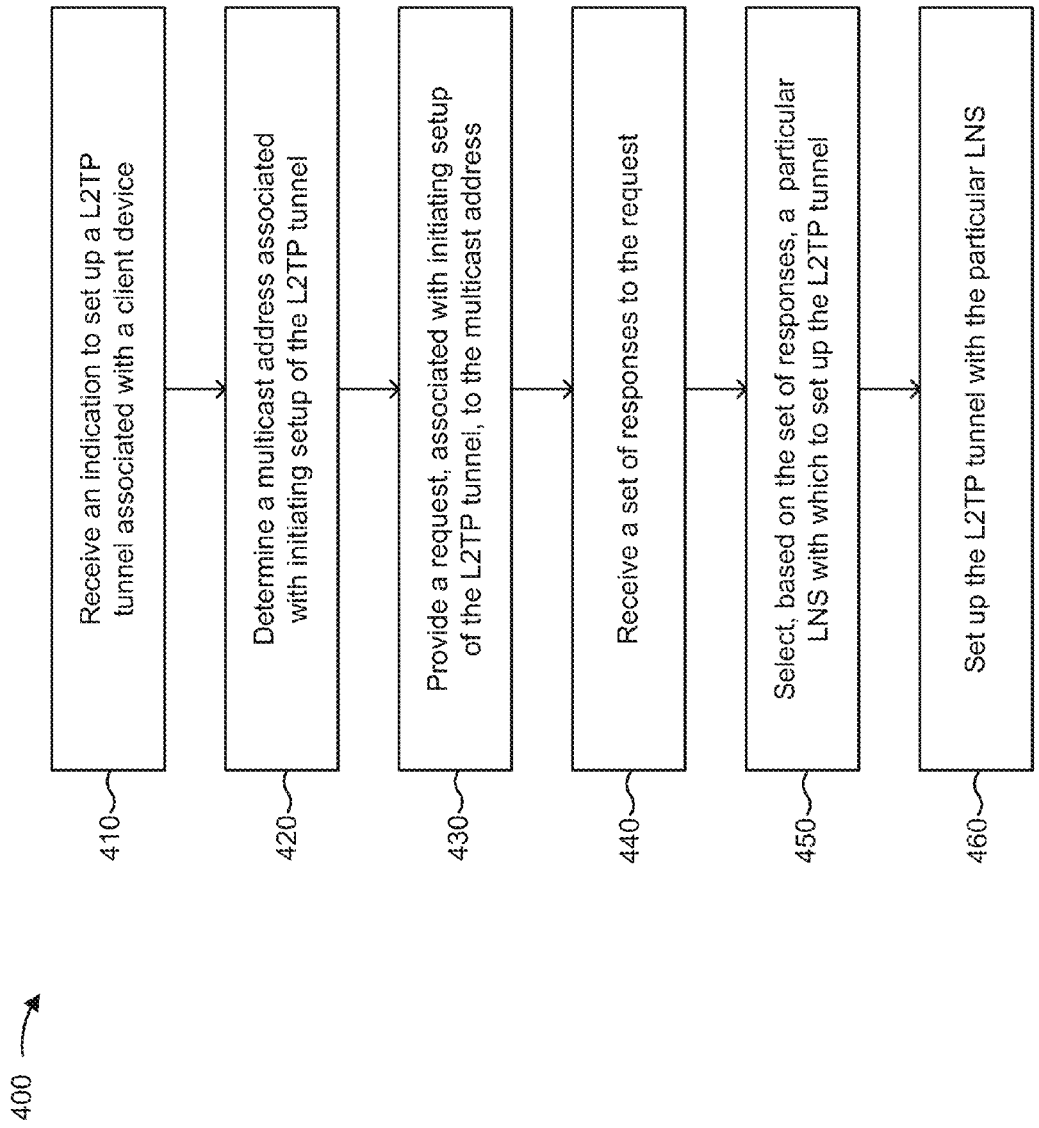

USING A MULTICAST ADDRESS AS A TUNNEL REMOTE GATEWAY ADDRESS IN A LAYER 2 TUNNELING PROTOCOL ACCESS CONCENTRATOR

BACKGROUND

The Layer 2 Tunneling Protocol (L2TP) is a client-server protocol that allows a data link layer protocol, such as the Point-to-Point Protocol (PPP), to be tunneled across a network. A L2TP access concentrator (LAC), associated with a first end of a tunnel, may forward packets to L2TP network server (LNS) associated with a second end of the tunnel.

SUMMARY

According to some possible implementations, a method may include: receiving, by a device, an indication to set up a layer 2 tunneling protocol (L2TP) tunnel associated with a client device; determining, by the device and based on information associated with the client device, a multicast address associated with initiating setup of the L2TP tunnel; providing, by the device and to the multicast address, a request associated with initiating the L2TP tunnel, where the request may be provided such that a plurality of other devices receives the request; receiving, by the device, a set of responses to the request, where the set of responses may be provided by a respective set of other devices, where the plurality of other devices may include the respective set of other devices; selecting, by the device and based on the set of responses, a particular device, of the respective set of other devices, with which to set up the L2TP tunnel; and initiating, by the device, setup of the L2TP tunnel with the particular device.

According to some possible implementations, a layer 2 tunneling protocol access concentrator (LAC) may include one or more processors to: receive an indication to set up a layer 2 tunneling protocol (L2TP) tunnel; determine, based on the indication, a multicast address associated with initiating setup of the L2TP tunnel; provide, to the multicast address, a request associated with initiating the L2TP tunnel, where the request may be provided such that a plurality of L2TP network servers (LNSs) receives the request; receive a set of responses to the request, where the set of responses may be provided by a respective set of LNSs, where the plurality of LNSs may include the respective set of LNSs; and select, based on the set of responses, a particular LNS, of the respective set of LNSs, with which to set up the L2TP tunnel.

According to some possible implementations, a non-transitory computer-readable medium may store one or more instructions that, when executed by one or more processors, cause the one or more processors to: receive an indication to set up a tunnel associated with a data link layer connection; determine, based on information associated with the data link layer connection, a multicast address associated with initiating setup of the tunnel; provide, to the multicast address, a request associated with initiating the tunnel, where the request may be provided such that a plurality of devices receives the request; receive a set of responses to the request, where the set of responses may be provided by a respective set of devices, where the plurality of devices may include the respective set of devices; select, based on the set of responses, a particular device, of the respective set of devices, with which to set up the tunnel; and set up the tunnel with the particular device.

BRIEF DESCRIPTION OF THE DRAWINGS

FIG. 4 is a flow chart of an example process for simultaneously attempting to initiate set up of a L2TP tunnel with multiple LNSs, and selecting a LNS, of the multiple LNSs, with which to initiate set up of the L2TP tunnel.

DETAILED DESCRIPTION

Figure 1A:
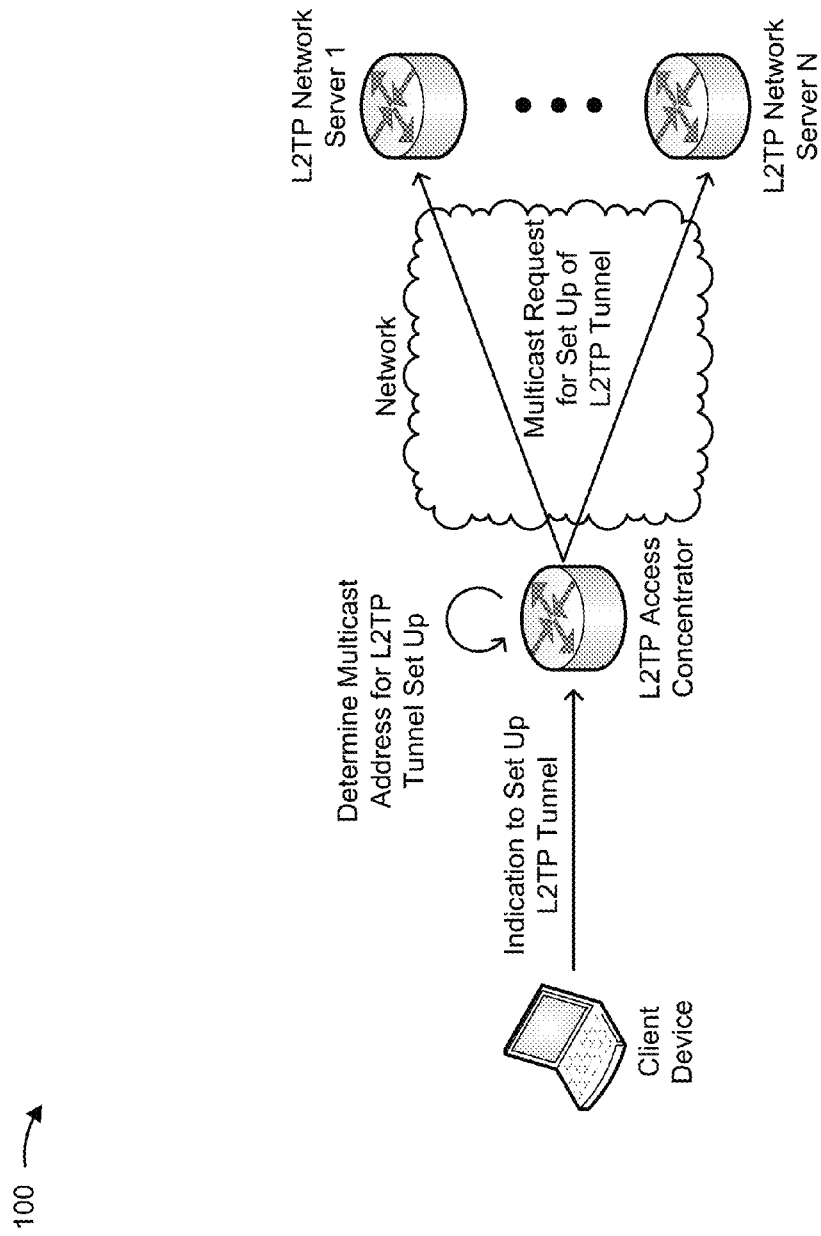
FIGS. 1A-1C are diagrams of an overview of an example implementation described herein.

The following detailed description of example implementations refers to the accompanying drawings. The same reference numbers in different drawings may identify the same or similar elements.

The L2TP may be used to tunnel data link layer (i.e., layer 2) traffic across a network, such as the Internet. Two primary components associated with L2TP are the LAC and the LNS, which are located at opposite ends of a L2TP tunnel and act to send and/or receive the data link layer traffic. In some implementations, the L2TP tunnel may be set up in order to allow a first device (e.g., a client device) to communicate with a remotely located second device (e.g., a server device) using a data link layer protocol, such as point-to-point protocol (PPP), PPP over Ethernet (PPPoE), or the like.

The LAC may be configured on a network device (e.g., a router, a gateway, etc.) that provides the client device with access to the network. Here, the LAC may receive an indication to set up a L2TP tunnel when, for example, the LAC receives a request associated with initiating a data link layer connection between the client device and the server device. The LAC may determine (e.g., based on the request, information that identifies the server device, information that identifies the client device, etc.) a set of LNSs with which the L2TP tunnel may be set up in order to allow the data link layer traffic (e.g., PPP frames, PPPoE frames, etc.) to be transmitted between the client device and the server device. The set of LNSs may be associated with one or more network devices that provide the server device with access to the network.

As an example, the LAC may identify a set of tunnel profiles, where each tunnel profile corresponds to a respective LNS with which the LAC may set up the L2TP tunnel. The LAC may then attempt to set up the L2TP tunnel with each LNS (e.g., one at a time, sequentially) until a LNS responds such that the LAC may set up the L2TP tunnel. However, in the situation where the LAC makes multiple attempts to establish the L2TP tunnel (e.g., when set up of the L2TP tunnel fails for one or more LNSs before being successfully set up) the client device may experience an unreasonable delay before being able to communicate with the server device. Moreover, processing resources, network bandwidth, battery power, or the like, may be wasted as a result of one or more failed attempts to establish the L2TP tunnel. Furthermore, the LAC must be configured with separate tunnel profiles for each of the LNSs, which may consume memory of the LAC and/or may require substantial configuration by a user.

Implementations described herein may allow a LAC to simultaneously attempt to initiate a L2TP tunnel with multiple LNSs by multicasting a setup request to each of the multiple LNSs. The LAC may then select a LNS, of the multiple LNSs, based on a set of responses to the setup request. This may reduce a delay in setting up the L2TP tunnel, reduce consumption of resources associated with setting up the L2TP tunnel, and/or reduce an amount of configuration associated with the multiple LNSs.

Figure 1B:
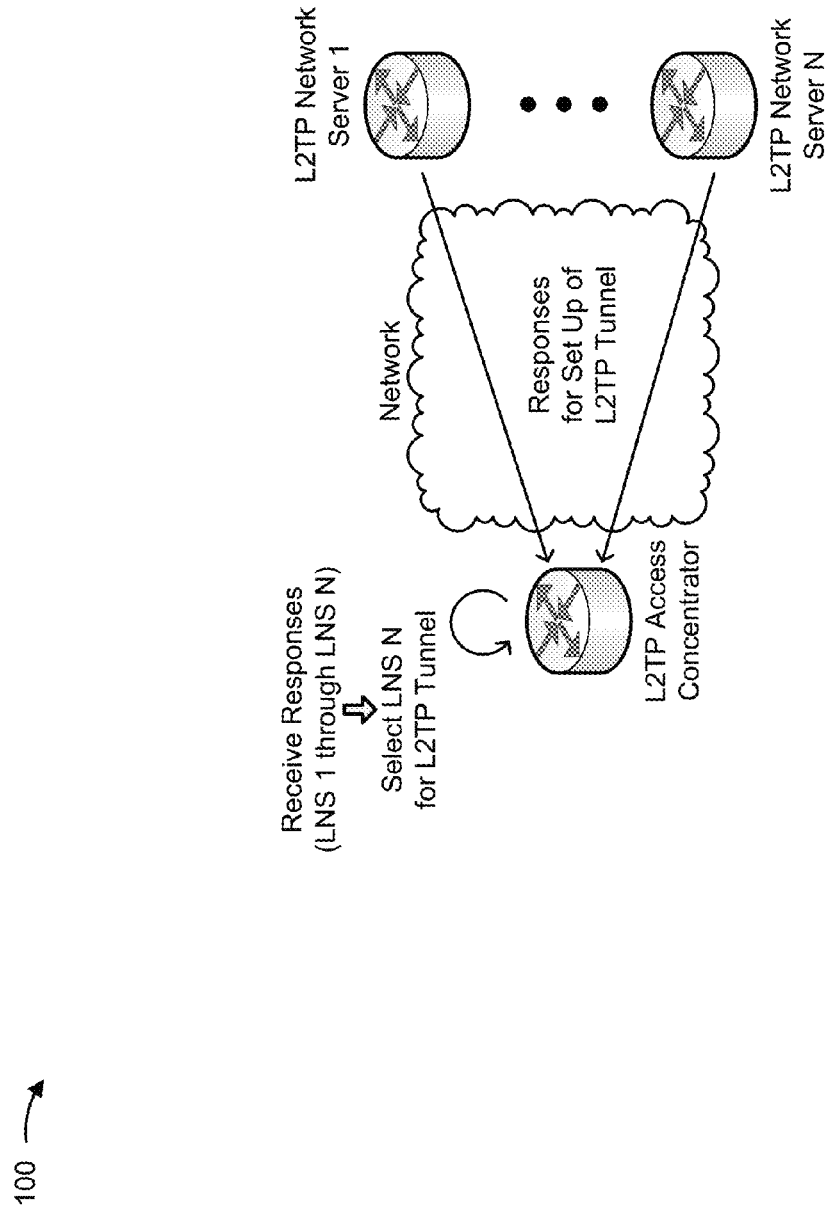
Figure 1C:
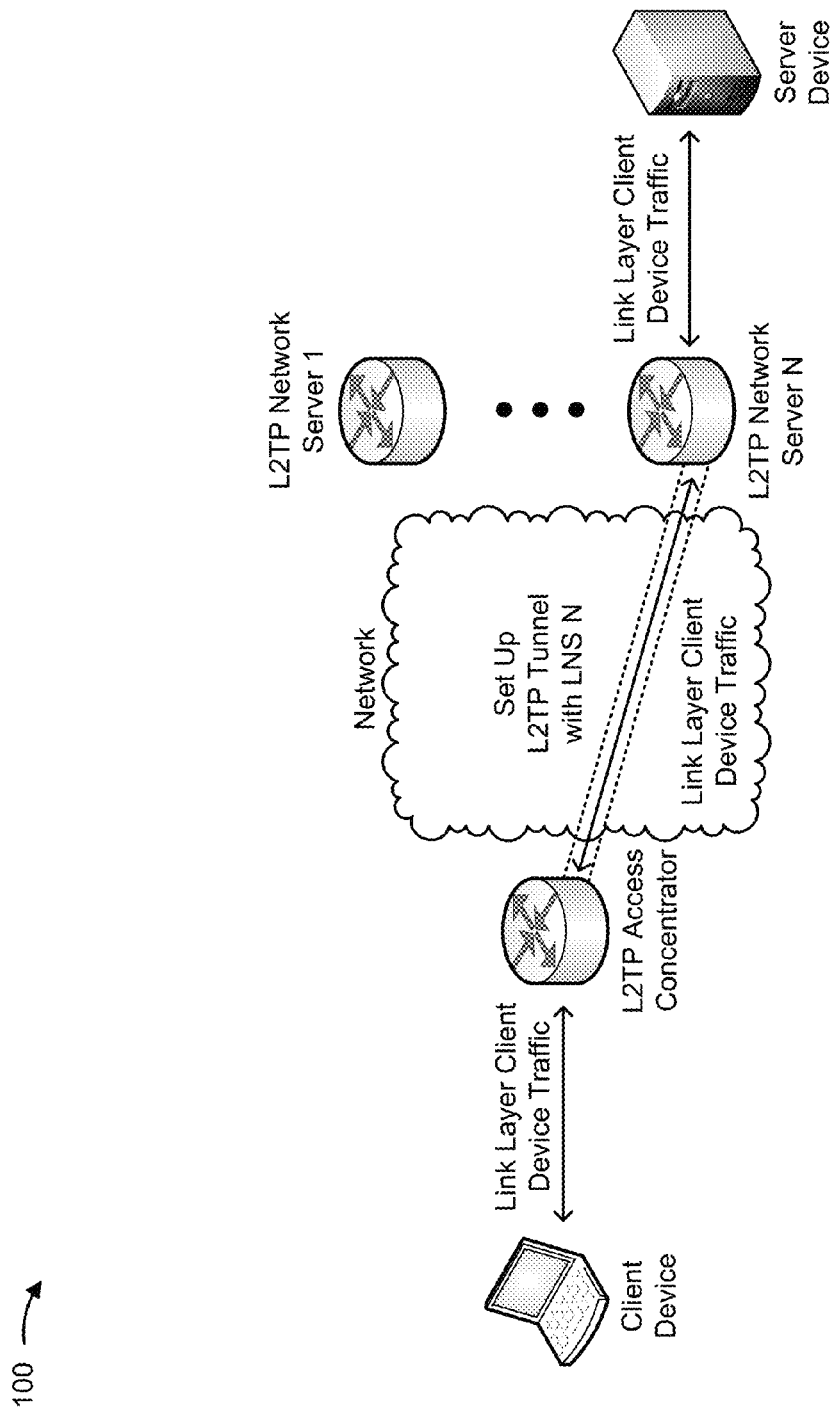

FIGS. 1A-1C are diagrams of an overview of an example implementation 100 described herein. For the purposes of example implementation 100, assume that a client device has received an indication to establish a connection that allows the client device to communicate (e.g., across a network, such as the Internet) with a remotely located server device at the data link layer. Further, assume that a LAC is positioned to provide the client device with access to the network, and that a LNS is positioned to provide the server device with access to the network.

As shown in FIG. 1A, the client device may provide, to the LAC, information indicating that the LAC is to set up a L2TP tunnel such that the client device and the server device may exchange data link layer traffic (e.g., via a PPP connection). As further shown, the LAC may determine (e.g., based on information associated with the client device, information associated with a user of the client device, information associated with the server device, etc.) a multicast address associated with initiating setup of the L2TP tunnel. For the purposes of example implementation 100, assume that multiple LNSs (e.g., LNS 1 through LNS N) are configured to receive traffic provided to the multicast address. As further shown, the LAC may provide, to the multicast address, a request associated with initiating setup of the L2TP tunnel. As shown, the multiple LNSs may receive the request.

As shown in FIG. 1B, based on receiving the request, one or more of the multiple LNSs may provide a respective set of responses to the request associated with initiating setup of the L2TP tunnel. As shown, the LAC may receive the set of responses, and may select a particular LNS (e.g., LNS N) with which to set up the L2TP tunnel. In some implementations, the LAC may select the particular LNS based on path information included in the set of responses, availability information included in the set of responses, a selection algorithm stored or accessible by the LAC, a set of generated selection scores, or the like, as described in further detail below.

As shown in FIG. 1C, the LAC may set up the L2TP tunnel with the particular LNS, and may establish a session that allows the client device to provide data link layer traffic to the server device. As shown, the client device and the server device may then send and/or receive data link layer traffic via the L2TP tunnel.

In this way, a LAC may simultaneously attempt to initiate a L2TP tunnel with multiple LNSs, and select a LNS, of the multiple LNSs, based on information provided by one or more of the multiple LNSs. This may reduce a delay in setting up the L2TP tunnel, reduce consumption of resources associated with setting up the L2TP tunnel, and/or reduce an amount of configuration associated with the multiple LNSs.

Figure 2:
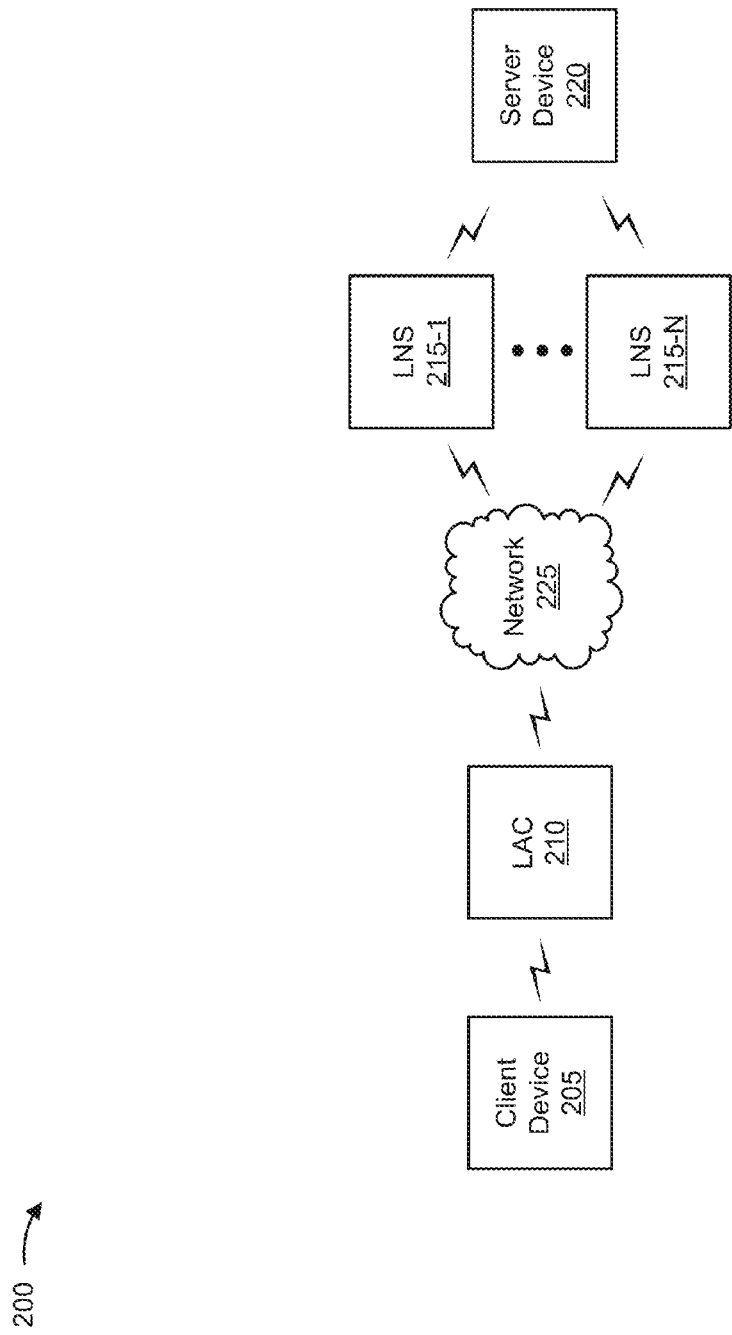
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 205, a LAC 210, two or more LNSs 215-1 through 215-N (N≥1) (hereinafter referred to collectively as LNSs 215, and individually as LNS 215), a server device 220, and a network 225. Devices of environment 200 may interconnect via wired connections, wireless connections, or a combination of wired and wireless connections.

Client device 205 may include one or more devices capable of communicating with other devices of environment 200. For example, client device 205 may include a computing device, such as a laptop computer, a tablet computer, a handheld computer, a desktop computer, a mobile phone (e.g., a smart phone, a radiotelephone, etc.), a server, or a similar device. In some implementations, client device 205 may configured to send and/or receive data link layer traffic over network 225.

LAC 210 may include a device capable of initiating setup of a L2TP tunnel with LNSs 215 such that data link layer information may be tunneled across network 225, and sending and/or receiving data link layer traffic via the L2TP tunnel. For example, LAC 210 may include a router, a gateway, a switch, a bridge, a server, a modem, a network interface card (NIC), a hub, an optical add-drop multiplexer (OADM), or another type of traffic transfer device. In some implementations, LAC 210 may provide client device 205 with access to network 225. In some implementations, LAC 210 may include a network access server (NAS) that provides access services for PPP users.

LNS 215 may include a device capable of sending and/or receiving data link layer traffic via the L2TP tunnel initiated by LAC 210. For example, LNS 215 may include a router, a gateway, a switch, a bridge, a server, a modem, a NIC, a hub, an OADM, or another type of traffic transfer device. In some implementations, LAC 210 may provide server device 220 with access to network 225. In some implementations, LNS 215 may include an edge device associated with an enterprise network.

Server device 220 may include one or more devices capable of communicating with other devices of environment 200. For example, server device 220 may include a server, a group of servers, a user device, or a similar device. In some implementations, server device 220 may be configured to send and/or receive data link layer traffic over network 225.

Network 225 may include one or more wired and/or wireless networks that allow remotely located devices to communicate, such as client device 205 and server device 220. For example, network 225 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
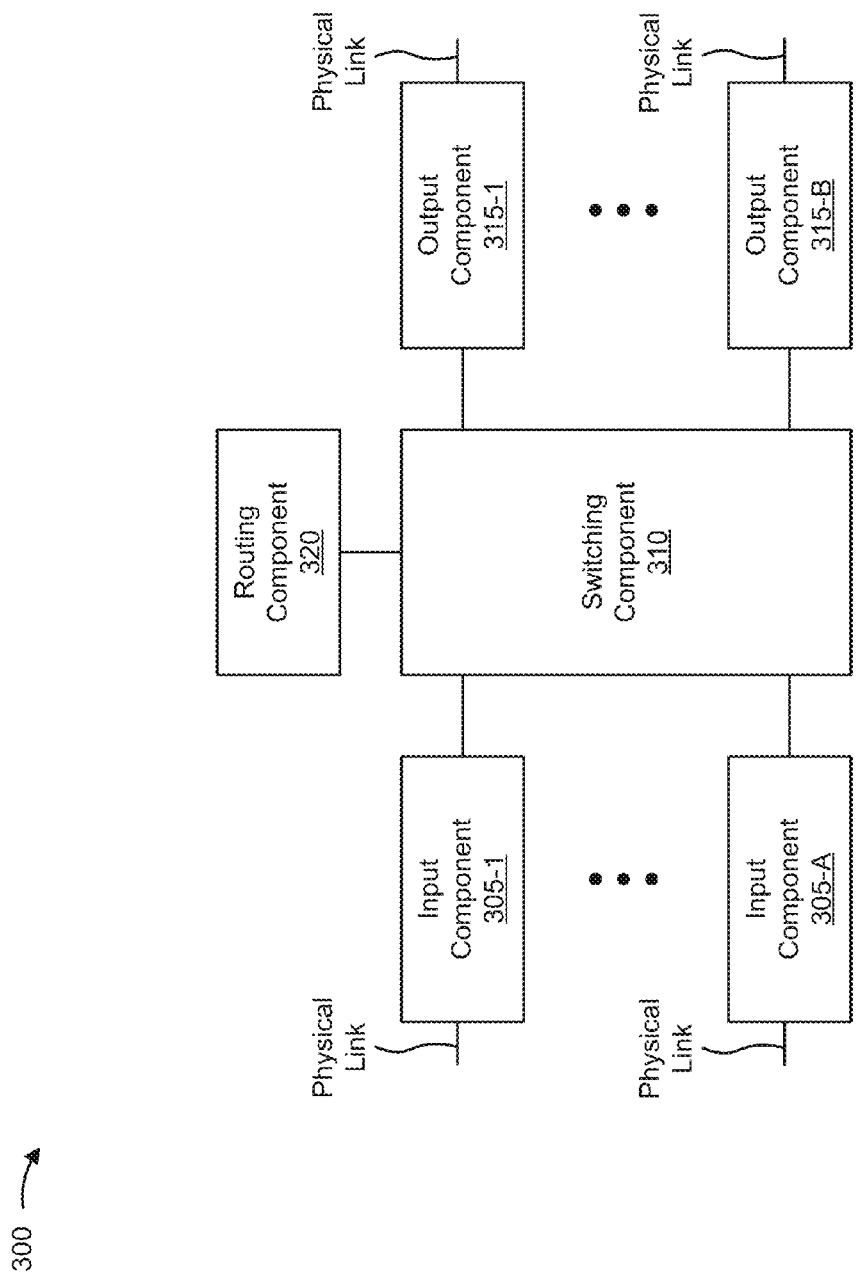
FIGS. 3A and 3B are diagrams of example components of one or more devices of FIG. 2.

FIG. 3A is a diagram of example components of a device 300. Device 300 may correspond to LAC 210 and/or LNS 215. In some implementations, LAC 210 and/or LNS 215 may include one or more devices 300 and/or one or more components of device 300. As shown in FIG. 3A, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a routing component 320.

Input component 305 may include points of attachment for physical links and may be points of entry for traffic, such as packets. Input component 305 may process received traffic, such as by performing data link layer encapsulation or decapsulation. In some implementations, input component 305 may send packets to output component 315 via switching component 310.

Switching component 310 may interconnect input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 may include points of attachment for physical links and may be points of exit for traffic, such as packets. Output component 315 may store packets and may schedule packets for transmission on output physical links. Output component 315 may include scheduling algorithms that support priorities and guarantees. Output component 315 may support data link layer encapsulation or decapsulation, and/or a variety of higher-level protocols. In some implementations, output component 315 may send packets and/or receive packets.

Routing component 320 may include one or more processors, microprocessors, field-programmable gate arrays (FPGAs), application-specific integrated circuit (ASICs), or similar types of processing components. In some implementations, routing component 320 may communicate with other devices, networks, and/or systems connected to device 300 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming packets.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
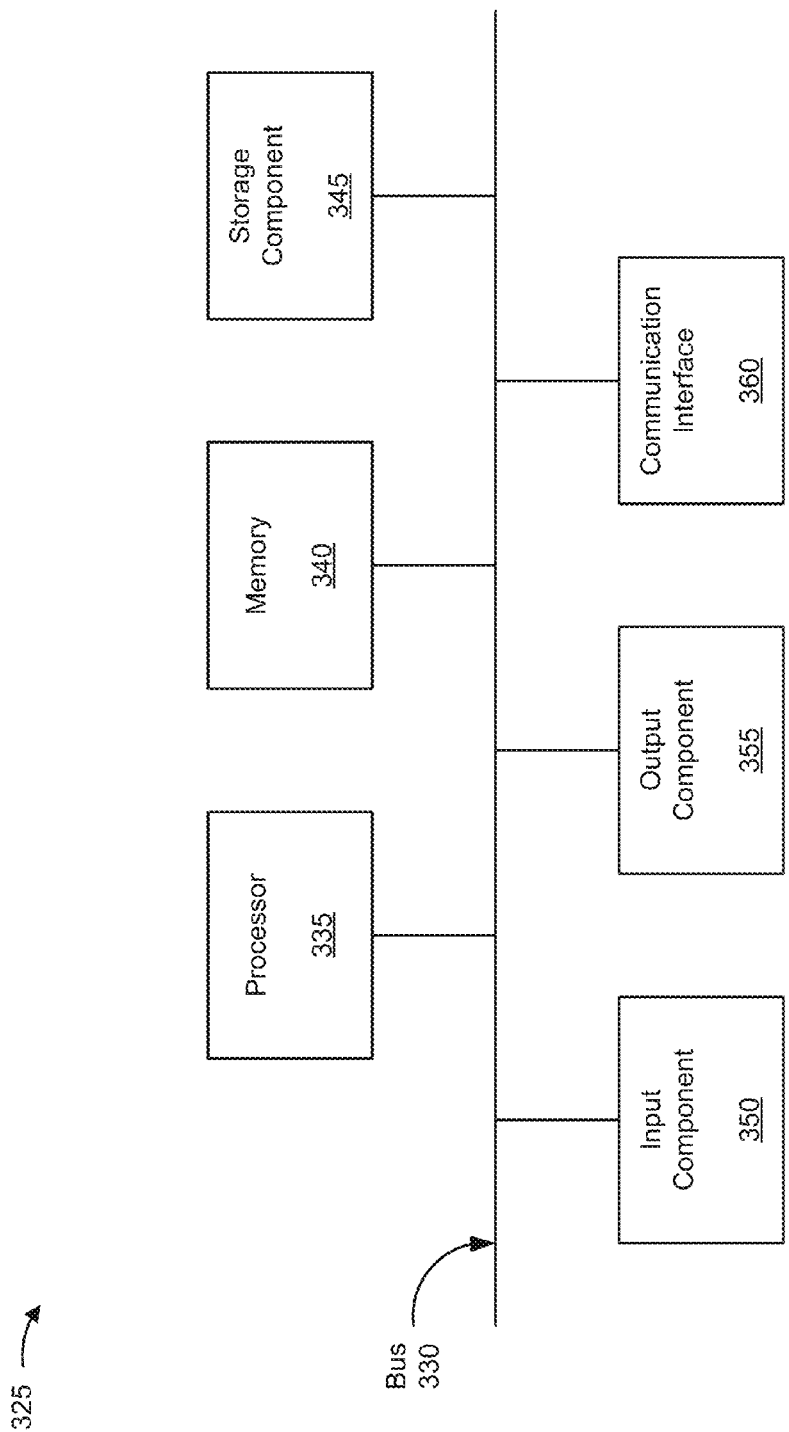

FIG. 3B is a diagram of example components of a device 325. Device 325 may correspond to client device 205 and/or server device 220. In some implementations, client device 205 and/or server device 220 may include one or more devices 325 and/or one or more components of device 325. As shown in FIG. 3B, device 325 may include a bus 330, a processor 335, a memory 340, a storage component 345, an input component 350, an output component 355, and a communication interface 360.

Bus 330 may include a component that permits communication among the components of device 325. Processor 335 is implemented in hardware, firmware, or a combination of hardware and software. Processor 335 may include a processor (e.g., a central processing unit (CPU), a graphics processing unit (GPU), an accelerated processing unit (APU), etc.), a microprocessor, and/or any processing component (e.g., an FPGA, an ASIC, etc.) that interprets and/or executes instructions. In some implementations, processor 335 may include one or more processors that are programmed to perform a function. Memory 340 may include a random access memory (RAM), a read only memory (ROM), and/or another type of dynamic or static storage device (e.g., a flash memory, a magnetic memory, an optical memory, etc.) that stores information and/or instructions for use by processor 335.

Storage component 345 may store information and/or software related to the operation and use of device 325. For example, storage component 345 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 325 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 355 may include a component that provides output information from device 325 (e.g., a display, a speaker, one or more light-emitting diodes (LEDs), etc.).

Communication interface 360 may include a transceiver-like component (e.g., a transceiver, a separate receiver and transmitter, etc.) that enables device 325 to communicate with other devices, such as via a wired connection, a wireless connection, or a combination of wired and wireless connections. Communication interface 360 may permit device 325 to receive information from another device and/or provide information to another device. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 325 may perform one or more processes described herein. Device 325 may perform these processes in response to processor 335 executing software instructions stored by a computer-readable medium, such as memory 340 and/or storage component 345. A computer-readable medium is defined herein as a non-transitory memory device. A memory device includes memory space within a single physical storage device or memory space spread across multiple physical storage devices.

Software instructions may be read into memory 340 and/or storage component 345 from another computer-readable medium or from another device via communication interface 360. When executed, software instructions stored in memory 340 and/or storage component 345 may cause processor 335 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as examples. In practice, device 325 may include additional components, fewer components, different components, or differently arranged components than those shown in FIG. 3B. Additionally, or alternatively, a set of components (e.g., one or more components) of device 325 may perform one or more functions described as being performed by another set of components of device 325.

FIG. 4 is a flow chart of an example process 400 for simultaneously attempting to initiate set up of a L2TP tunnel with multiple LNSs, and selecting a LNS, of the multiple LNSs, with which to initiate set up of the L2TP tunnel. In some implementations, one or more process blocks of FIG. 4 may be performed by LAC 210. In some implementations, one or more process blocks of FIG. 4 may be performed by another device or a group of devices separate from or including LAC 210, such as client device 205 and/or another device of environment 200.

As shown in FIG. 4, process 400 may include receiving an indication to set up a L2TP tunnel associated with a client device (block 410). For example, LAC 210 may receive an indication to set up a L2TP tunnel associated with client device 205. In some implementations, LAC 210 may receive the indication after client device 205 establishes a data link layer connection with a LAC 210, such as a PPP link. Additionally, or alternatively, LAC 210 may receive the indication when LAC 210 receives information indicating that client device 205 wishes to extend the data link layer connection such that client device 205 and server device 220 may exchange traffic at the data link layer across network 225.

In some implementations, the indication to set up the L2TP tunnel may be based on establishment of a data link layer connection with LAC 210. For example, client device 205 may initiate a PPP connection with LAC 210, and may exchange Link Control Protocol (LCP) packets with LAC 210 in order to establish the PPP connection. LAC 210 may also authenticate client device 205 while establishing the PPP connection. Next, LAC 210 may determine whether to terminate the PPP connection at LAC 210 or to tunnel the PPP connection to LNS 215. In some implementations, LAC 210 may determine whether to tunnel the PPP connection based on, for example, a username, a password, a device identifier, a client device address, a domain name, authentication information, information that associated with server device 220 or the like, provided by client device 205 during establishment of the PPP connection (e.g., provided during the LCP packet exchange, during authentication of client device 205, etc.).

As further shown in FIG. 4, process 400 may include determining a multicast address associated with initiating setup of the L2TP tunnel (block 420). For example, LAC 210 may determine a multicast address associated with initiating setup of the L2TP tunnel. In some implementations, LAC 210 may determine the multicast address after LAC 210 determines that LAC 210 is to tunnel the L2TP session associated with client device 205.

The multicast address may include a network address associated with attempting to initiate setup of the L2TP tunnel with multiple LNSs 215 at once (i.e., simultaneously). For example, the multicast address may include a network address (e.g., a remote gateway address) to which LAC 210 may provide a request (e.g., a Start-Control-Connection-Request (SCCRQ)) associated with initiating setup of the L2TP tunnel, where the request may be substantially concurrently received by multiple LNSs 215.

In some implementations, LAC 210 may determine the multicast address based on information associated with the PPP connection. For example, LAC 210 may store or have access to a group of L2TP tunnel profiles associated with configurations for setting up L2TP tunnels, where each of the L2TP tunnel profiles may include a multicast address. Here, LAC 210 may identify, based on the information associated with the PPP connection (e.g., the username, the password, the device identifier, the client device address, the domain name, the authentication information, etc.) a particular tunnel profile to be used to set up the L2TP tunnel, and may determine the multicast address included in the tunnel profile.

In some implementations, multiple LNSs 215 may be configured with the multicast address such that each of the multiple LNSs 215 may receive a request provided to the multicast address. In some implementations, the multiple LNSs 215 may be configured such that the multiple LNSs 215 automatically (e.g., upon powering on, upon enabling LNS functionality, etc.) join a multicast group associated with the multicast address. This may eliminate a need to configure a remote gateway address, associated with each LNS 215, on LAC 210. Alternatively, the multiple LNSs 215 may join the multicast group, and the multicast address, associated with the multicast group, may be added in a remote gateway address field at LAC 210.

As such, configuration of LAC 210 and/or the multiple LNSs 215 may be simplified. Moreover, an amount of memory resources consumed by LAC 210 may be reduced, since LAC 210 may store fewer network addresses and/or tunnel profiles (e.g., as compared to storing network addresses for each of the multiple LNSs 215). Similarly, an amount of processing resources consumed by LAC 210 may be reduced since LAC 210 may perform fewer lookups when determining the multicast address as compared to looking up multiple network addresses.

As further shown in FIG. 4, process 400 may include providing a request, associated with initiating setup of the L2TP tunnel, to the multicast address (block 430). For example, LAC 210 may provide a request, associated with initiating setup of the L2TP tunnel, to the multicast address. In some implementations, LAC 210 may provide the request after LAC 210 determines the multicast address.

In some implementations, LAC 210 may provide the request in order to cause the multiple LNSs 215 to receive the request (e.g., the multiple LNSs 215 configured to listen to the multicast address). In some implementations, the request may include a request associated with initiating setup of the L2TP tunnel, such as a SCCRQ.

In this way, LAC 210 may simultaneously attempt to initiate setup of the L2TP tunnel with the multiple LNSs 215 (e.g., rather than one at a time, sequentially, etc.). In some implementations, an amount of resources, consumed by LAC 210, may be reduced as a result of providing the request to the multicast address. For example, by providing the request to the multicast address, an amount of processing resources and/or network bandwidth may be reduced (e.g., as compared to sending separate requests to the multiple LNSs 215). Moreover, an amount of power consumed by LAC 210 may be reduced as a result of providing the request to the multicast address.

As further shown in FIG. 4, process 400 may include receiving a set of responses to the request (block 440). For example, LAC 210 may receive a set of responses to the request. In some implementations, LAC 210 may receive the set of responses after LAC 210 provides the request to the multicast address. Additionally, or alternatively, LAC 210 may receive the set of responses after a corresponding one or more LNSs 215 provide the set of responses.

In some implementations, the set of responses may include one or more responses provided by one or more LNSs 215 of the multiple LNSs 215. For example, as described above, multiple LNSs 215 may be configured to receive the request provided to the multicast address. Here, one or more of the multiple LNSs 215 may receive the request and provide a response indicating that the request was accepted (e.g., to indicate that setup of the L2TP tunnel may continue). In some implementations, one or more of the multiple LNSs 215 may not provide a response (e.g., when the request is not accepted). In some implementations, the set of responses may include a set of Start-Control-Connection-Replies (SCCRPs) responsive to the SCCRQ provided by LAC 210.

In some implementations, one or more of the multiple LNSs 215 may provide responses to the request. For example, a first LNS 215, of the multiple LNSs 215, may provide a response when the first LNS 215 is available to support the L2TP tunnel. Conversely, a second LNS 215, of the multiple LNSs 215, may not provide a response when the second LNS 215 is not available to support the L2TP tunnel. As such, the set of responses may include responses associated with one or more LNSs 215 with which the LAC 210 may set up the L2TP tunnel. Thus, based on providing a single request, LAC 210 may determine which LNSs 215, of the multiple LNSs 215 configured to receive requests provided to the multicast address, are available to set up the L2TP tunnel (e.g., since only those LNSs 215 that accept the request may provide a response). In some implementations, the multiple LNSs 215 may be configured with varying delay settings associated with providing respective responses (e.g., in order to achieve load balancing of responses received by LAC 210).

In some implementations, a response, provided by LNS 215, may include information that may be used by LAC 210 to select a particular LNS 215 with which to set up the L2TP tunnel, as described below. For example, the response may include path information associated with a route between LAC 210 and LNS 215, such as a path length, a path cost, or the like. As another example, the response may include availability information associated with LNS 215, such as a number of L2TP tunnels currently supported by LNS 215, an amount of available processing resources of LNS 215, an amount of available memory of LNS 215, an amount of available bandwidth associated with LNS 215, or the like.

As further shown in FIG. 4, process 400 may include selecting, based on the set of responses, a particular LNS with which to set up the L2TP tunnel (block 450). For example, LAC 210 may select, based on the set of responses, a particular LNS 215 with which to set up the L2TP tunnel. In some implementations, LAC 210 may select the particular LNS 215 when LAC 210 receives the set of responses. In some implementations, LAC 210 may select the particular LNS 215 when LAC 210 receives information indicating that LAC 210 is to select the particular LNS 215.

In some implementations, LAC 210 may select the particular LNS 215 based on timing of the set of responses received by LAC 210. For example, LAC 210 identify an earliest received response (e.g., a response received first in time) and may select the LNS 215 that provided the earliest received response. As another example, LAC 210 may identify responses received within a threshold amount of time after sending the request (e.g., two seconds, five seconds, ten seconds, etc.) and may select the particular LNS 215 based on the responses received within threshold amount period of time. As a particular example, LAC 210 may receive the responses within the threshold amount of time, and may select the particular LNS 215 based on path information and/or availability information associated with those LNSs 215, as described below.

Additionally, or alternatively, LAC 210 may select the particular LNS 215 based on the path information and/or the availability information associated with two or more LNSs 215. For example, LAC 210 may select the particular LNS 215 with a shortest path length, a lowest path cost, a smallest number of L2TP tunnels currently supported, a greatest amount of available processing resources, a greatest amount of available memory, a greatest amount of available bandwidth, or the like. In some implementations, LAC 210 may select the particular LNS 215 based on a combination, or a weighted combination, of the information identified above.

Additionally, or alternatively, LAC 210 may select the particular LNS 215 based on a selection algorithm stored or accessible by LAC 210. Here, LAC 210 may provide the path information and/or the availability information, associated with two or more LNSs 215, as inputs to the algorithm, and may receive information that identifies the particular LNS 215 as an output of the algorithm. As an example, the selection algorithm may cause LAC 210 to identify a first group of LNSs 215 based on timing of responses associated with the set of LNSs 215 (e.g., a first group of LNSs 215 corresponding to a first received five responses to the request, a first group of LNSs 215 corresponding to responses received within a threshold time period after sending the request, etc.). The selection algorithm may then cause LAC 210 to select, from the first group of LNSs 215, a second group of LNSs 215 based on the path information associated with the first group of LNSs 215 (e.g., a group of LNSs 215, of the first group of LNSs 215 with a path cost below a threshold value, etc.). The selection algorithm may then cause LAC 210 to select, from the second group of LNSs 215 the particular LNS 215 based on the availability information associated with the second group of LNSs 215 (e.g., a particular LNS 215, of the second group of LNSs 215, with a lowest number of L2TP tunnels currently supported, etc.).

Additionally, or alternatively, LAC 210 may select the particular LNS 215 based on generating a set of selection scores associated with two or more LNSs 215. For example, LAC 210 may store or have access to a formula (e.g., a mathematical formula) designed to calculate, for each LNS 215, a selection score (e.g., a value from 0 to 1, a value from 0 to 10, etc.) based on the number of L2TP tunnels currently supported by LNS 215, the amount of available processing resources of LNS 215, the amount of available memory of LNS 215, the amount of available bandwidth associated with LNS 215, or the like. Here, LAC 210 may calculate a set of selection scores for each LNS 215, of the two or more LNSs 215 that provided the responses, and LAC 210 may select the particular LNS 215 based on the set of selections scores (e.g., a highest selection score, a lowest selection score, a selection score that satisfies a threshold, etc.). In some implementations, the manner in which LAC 210 selects the particular LNS 215 may be configurable on LAC 210.

As further shown in FIG. 4, process 400 may include setting up the L2TP tunnel with the particular LNS (block 460). For example, LAC 210 may set up the L2TP tunnel with the particular LNS 215. In some implementations, LAC 210 may set up the L2TP tunnel with the particular LNS 215 after LAC 210 selects the particular LNS 215.

In some implementations, LAC 210 may set up the L2TP tunnel with the particular LNS 215 based on providing a message to the particular LNS 215. For example, LAC 210 may provide, to the particular LNS 215, a message (e.g., a Start-Control-Connection-Connected (SCCCN) message) in reply to the response provided by the particular LNS 215. The particular LNS 215 may receive the message, and may provide, to LAC 210, an acknowledgment (e.g., a Zero-Length Body (ZLB) message) in order to complete the setup of the L2TP tunnel between LAC 210 and the particular LNS 215. Session establishment between the LAC 210 and the particular LNS 215 may proceed and, after session establishment is complete, the PPP connection between client device 205 and LNS 215 is complete, and client device 205 and server device 220 may exchange data link layer information via the L2TP tunnel.

In this way, LAC 210 may need to communicate with a single LNS 215 (e.g., the particular LNS 215) in order to set up the L2TP tunnel after providing the request. As such, a delay associated with setting up the L2TP tunnel, a delay associated with communications between client device 205 and server device 220, an amount of processing resources consumed by LAC 210, and/or amount of network resources consumed by LAC 210 may be reduced.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may allow a LAC to simultaneously attempt to initiate a L2TP tunnel with multiple LNSs by multicasting a setup request to each of the multiple LNSs. The LAC may then select a LNS, of the multiple LNSs, based on a set of responses to the setup request. This may reduce a delay in setting up the L2TP tunnel, reduce consumption of resources associated with setting up the L2TP tunnel, and/or reduce an amount of configuration associated with the multiple LNSs.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, an indication to set up a layer 2 tunneling protocol (L2TP) tunnel associated with a client device;
    determining, by the device and based on information associated with the client device, a multicast address associated with initiating setup of the L2TP tunnel;
    providing, by the device and to the multicast address, a request associated with initiating the L2TP tunnel,
        the request being provided such that a plurality of other devices receives the request;
    receiving, by the device, a set of responses to the request,
        the set of responses being provided by a respective set of other devices,
            the plurality of other devices including the respective set of other devices;
    selecting, by the device and based on the set of responses, a particular device, of the respective set of other devices, with which to set up the L2TP tunnel; and
    initiating, by the device, setup of the L2TP tunnel with the particular device.

2. The method of claim 1, where the device includes a L2TP access concentrator and the plurality of other devices includes a plurality of L2TP network servers.

3. The method of claim 1, where determining the multicast address comprises:
    identifying, based on the information associated with the client device, a tunnel profile associated with the client device; and
    determining the multicast address based on the identified tunnel profile.

4. The method of claim 1, further comprising:
    establishing the L2TP tunnel with the particular device after selecting the particular device.

5. The method of claim 1, where selecting the particular device comprises:
    identifying an earliest received response of the set of responses; and
    selecting the particular device as one of the respective set of other devices that provided the earliest received response.

6. The method of claim 1, where selecting the particular device comprises:
provide information included in the set of responses as input to a selection algorithm,
the information included in the set of responses including path information or availability information associated with the respective set of other devices; and
receiving information that identifies the particular device as an output of the selection algorithm.

7. The method of claim 1, where selecting the particular device comprises:
generating a set of selection scores corresponding to the respective set of other devices,
the set of selection scores being generated based on path information or availability information associated with the respective set of other devices; and
selecting the particular device based on the set of selection scores.

8. A layer 2 tunneling protocol access concentrator (LAC), comprising:
one or more processors to:
receive an indication to set up a layer 2 tunneling protocol (L2TP) tunnel;
determine, based on the indication, a multicast address associated with initiating setup of the L2TP tunnel;
provide, to the multicast address, a request associated with initiating the L2TP tunnel,
the request being provided such that a plurality of L2TP network servers (LNSs) receives the request;
receive a set of responses to the request,
the set of responses being provided by a respective set of LNSs,
the plurality of LNSs including the respective set of LNSs; and
select, based on the set of responses, a particular LNS, of the respective set of LNSs, with which to set up the L2TP tunnel.

9. The LAC of claim 8, where the request is a Start-Control-Connection-Request and the set of responses is a set of Start-Control-Connection-Replies.

10. The LAC of claim 8, where the one or more processors, when determining the multicast address, are to:
identify, based on information included in the indication, a tunnel profile associated with the L2TP tunnel; and
determine the multicast address based on the identified tunnel profile.

11. The LAC of claim 8, where the one or more processors are further to:
set up the L2TP tunnel with the particular LNS after selecting the particular LNS.

12. The LAC of claim 8, where the one or more processors, when selecting the particular LNS, are to:
identify an earliest received response of the set of responses; and
select the particular LNS as one of the respective set of LNSs that provided the earliest received response.

13. The LAC of claim 8, where the one or more processors, when selecting the particular LNS, are to:
provide information included in the set of responses as input to a selection algorithm,
the information included in the set of responses including path information or availability information associated with the respective set of LNSs; and
receive information that identifies the particular LNS as an output of the selection algorithm.

14. The LAC of claim 8, where the one or more processors, when selecting the particular LNS, are to:
generate a set of selection scores corresponding to the respective set of LNSs,
the set of selection scores being generated based on path information or availability information associated with the respective set of LNSs; and
select the particular LNS based on the set of selection scores.

15. A non-transitory computer-readable medium storing instructions, the instructions comprising:
one or more instructions that, when executed by one or more processors, cause the one or more processors to:
receive an indication to set up a tunnel associated with a data link layer connection;
determine, based on information associated with the data link layer connection, a multicast address associated with initiating setup of the tunnel;
provide, to the multicast address, a request associated with initiating the tunnel,
the request being provided such that a plurality of devices receives the request;
receive a set of responses to the request,
the set of responses being provided by a respective set of devices,
the plurality of devices including the respective set of devices;
select, based on the set of responses, a particular device, of the respective set of devices, with which to set up the tunnel; and
set up the tunnel with the particular device.

16. The non-transitory computer-readable medium of claim 15, where the plurality of devices includes a plurality of layer 2 tunneling protocol network servers.

17. The non-transitory computer-readable medium of claim 15, where the one or more instructions, that cause the one or more processors to determine the multicast address, cause the one or more processors to:
identify, based on information associated with the data link layer connection, a tunnel profile associated with the tunnel; and
determine the multicast address based on the identified tunnel profile.

18. The non-transitory computer-readable medium of claim 15, where the one or more instructions, that cause the one or more processors to select the particular device, cause the one or more processors to:
determine path information or availability information associated with the respective set of devices; and
select the particular device based on respective weighted combinations of the path information or the availability information.

19. The non-transitory computer-readable medium of claim 15, where the one or more instructions, that cause the one or more processors to select the particular device, cause the one or more processors to:
provide information included in the set of responses as input to a selection algorithm,
the information included in the set of responses including path information or availability information associated with the respective set of devices; and
receive information that identifies the particular device as an output of the selection algorithm.

20. The non-transitory computer-readable medium of claim 15, where the one or more instructions, that cause the one or more processors to select the particular device, cause the one or more processors to:

generate a set of selection scores corresponding to the respective set of devices,
  the set of selection scores being generated based on path information or availability information associated with the respective set of devices; and
select the particular device based on the set of selection scores.

* * * * *